US006993336B2

(12) United States Patent
Aerrabotu et al.

(10) Patent No.: US 6,993,336 B2
(45) Date of Patent: Jan. 31, 2006

(54) ROAMING INDICATORS FOR MULTI-MODE WIRELESS COMMUNICATION DEVICES

(75) Inventors: Naveen Aerrabotu, Gurnee, IL (US); Scott T. Droste, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 112 days.

(21) Appl. No.: 10/736,270

(22) Filed: Dec. 15, 2003

(65) Prior Publication Data

US 2005/0130661 A1 Jun. 16, 2005

(51) Int. Cl.
*H04Q 7/20* (2006.01)

(52) U.S. Cl. ........................................................ 455/437

(58) Field of Classification Search ................ 455/437, 455/552.1

See application file for complete search history.

(56) References Cited

OTHER PUBLICATIONS

"TIA/EIA/IS-683-A: Over-the-Air Service Provisioning of Mobile Stations in Spread Spectrum Systems", Ballot Resolution Version, Apr. 1998.

*Primary Examiner*—William D. Cumming
(74) *Attorney, Agent, or Firm*—Hisashi D. Watanabe

(57) ABSTRACT

A method (400) and a multi-mode wireless communication device (700) for identifying a preferred system. The multi-mode wireless communication device (700) receives (404) preferred roaming list information ("PRL") including system identifier information such as System Identification, Network Identification, and Service Set Identifier, and enhanced roaming indicators ("ERI") associated with the system identifier information, transmits (408) a request for functionality extension table information, receives (410) the functionality extension table information, identifies (414) a currently available preferred system based upon the system identifier information; and conveys (416) information indicative of the identified currently available preferred system based upon the functionality extension table information.

18 Claims, 6 Drawing Sheets

200

| SYSTEM IDENTIFIER (202) | CARRIER IDENTITY (206) | ERI (204) |
|---|---|---|
| 1 | CARRIER A | 2 |
| 2 | CARRIER B | 3 |
| 3 | CARRIER C | 1 |
| 4 | CARRIER D | 8 |
| 5 | CARRIER X | 6 |
| 6 | CARRIER Y | 10 |
| • | • | • |
| • | • | • |
| • | • | • |
| N | CARRIER Z | 200 |

| ERI (302) | ACTION (304) |
|---|---|
| 1 | INDICATOR OFF |
| 2 | INDICATOR ON |
| 3 | INDICATOR FLASH |
| 4 | ICON A |
| 5 | ICON B |
| 6 | ICON C |
| • | • • |
| • | • • |
| • | • • |
| 200 | TEXT BANNER 10 |

FIG. 3

ROAMING INDICATORS FOR MULTI-MODE WIRELESS COMMUNICATION DEVICES

FIELD OF THE INVENTION

The present invention relates generally to a method and an apparatus for searching an available system, and more specifically to a method and an apparatus for a wireless communication device for identifying a preferred system that is currently available.

BACKGROUND OF THE INVENTION

It is known to provide a cellular telephone, or a mobile terminal, using the Code Division Multiple Access ("CDMA") with a table called Preferred Roaming List ("PRL"). Based upon the information contained in the PRL, such as System Identification ("SID") and Network Identification ("NID"), the cellular telephone determines the most appropriate network to register itself. Depending on the availability of systems and networks in the environment where the cellular telephone is located, the cellular telephone may receive a new PRL appropriate for the current environment of the cellular telephone over the air to replace the existing PRL. Currently, the cellular telephone supports three types of roaming indicators associated with the PRL, which help notify the user the roaming status of the cellular telephone in the current environment. The roaming status then indicates to the user that there may be a fee or different rate charged for making a call in the current area. For example, the first type of the indicators may indicate that the cellular telephone is in a home network, i.e., not roaming, by having the roaming indicator light turned off; the second type of the indicators may indicate that the cellular telephone is in a preferred roaming network by having the roaming indicator light turned on; and the third type of the indicators may indicate that the cellular telephone is in a non-preferred roaming network by having the roaming indicator light flashing. As defined in TIA/EIA TSB58b section 8.1, enhanced roaming indicators ("ERI"), supporting more than three types of indicators, may be provided in the cellular telephone to enhance the information conveyed to the user such as the roaming condition. The ERI may be particularly desirable for a multi-mode cellular telephone, which is capable of operating in more than one cellular telephone network types including CDMA, wireless local area network ("WLAN"), Advanced Mobile Phone System ("AMPS"), Global System for Mobile ("GSM"), and Time Division Multiple Access ("TDMA"). For example, the multi-mode cellular telephone may first operate in a first mode such as CDMA in a first network such as its home network operated by System Provider A, and then may roam to a second network operated by System Provider B operating in a second mode such as TDMA. Each system provider is likely to have its own agreement with other system providers such as a WLAN provider within its own service area, and is likely to have its own PRL. The first PRL provided by System Provider A to the multi-mode cellular telephone therefore is likely to be different from the PRL provided by System Provider B. As the multi-mode cellular telephone roams and if the PRL of the multi-mode cellular telephone is replaced with a new and different PRL, the information associated with the ERI may not be correctly associated with the ERI of the new PRL.

BRIEF DESCRIPTION OF THE DRAWINGS

FIG. 2 is an exemplary representation of some of the information included in a preferred roaming list;

FIG. 3 is an exemplary representation of some of the information included in a functionality extension table;

DETAILED DESCRIPTION OF THE PREFERRED EMBODIMENTS

The present invention relates to a method and an apparatus for a wireless communication device for searching and identifying a preferred available system. In some applications, a first set of data, such as a preferred roaming list ("PRL"), is stored in the wireless communication device, and a second set of data, for example, enhanced roaming indicator ("ERI") table, associated with or synchronized to the first set of data is also stored in the wireless communication device. However, depending upon the availability of systems and networks in a new environment, the wireless communication device may receive a new PRL, which may not be synchronized to the current ERI table already stored in the device, as the wireless communication device roams from one environment to the next.

Figure 1:
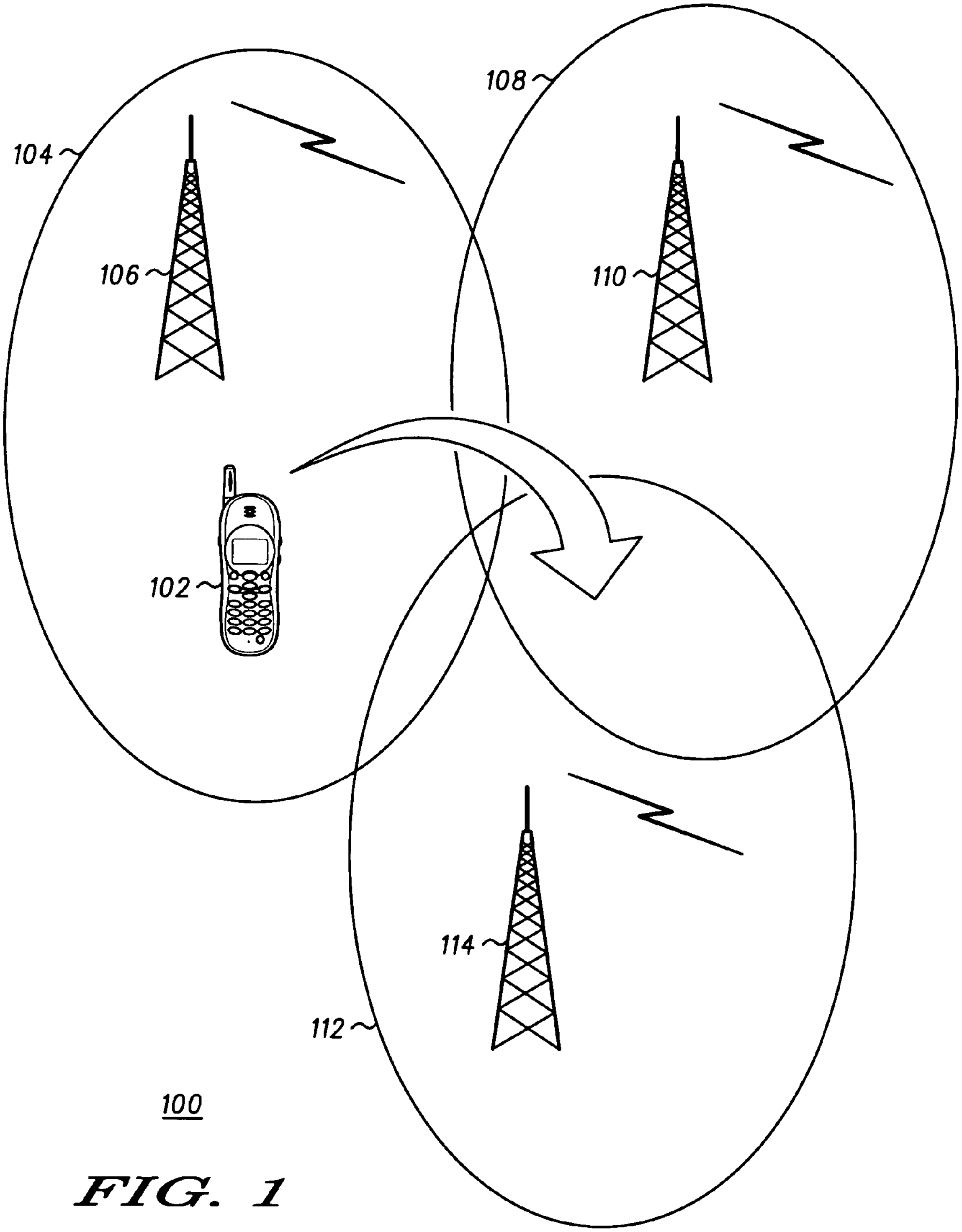
FIG. 1 is an exemplary environment where the present invention may be practiced.

FIG. 1 is an exemplary environment where some aspects of the present inventions may be practiced. When a multi-mode wireless communication device 102 initially located in a first region 104, which is supported by a first carrier ("Carrier A") operating a first network 106, leaves the first region 104 and enters a second region 108 supported by a second carrier ("Carrier B") operating a second network 110, it may be necessary for the multi-mode wireless command device 102 to register and to operate in the second region 108. For example, in some instances, the first network 106 may be too far from the multi-mode wireless communication device 102 to effectively communicate, and the second network 110 may be compatible with the multi-mode wireless communication device 102 and better able to support continued communication. In other instances, the multi-mode wireless communication device 102 may further choose to operate in a certain network over other available networks. For example, the multi-mode wireless communication device 102 may choose to register and to operate in the second network 110 even though there is a third carrier ("Carrier C") in a third network 114 providing a better signal to the multi-mode wireless communication device 102 than the second network 110 in a third region.

A home carrier of the multi-mode wireless communication device 102 may have different contracts with each of the Carriers A, B, and C, which may affect the fee charged for usage of the multi-mode wireless communication device 102 within each of the networks and may affect the order of preference regarding the choice of networks, or may limit the ability of the multi-mode wireless communication device 102 to operate in certain networks. To assist in determining the status of the multi-mode wireless communication device 102 in a given network, the multi-mode wireless communication device 102 can refer to a preferred roaming list ("PRL"), preferably a multi-mode PRL including at least one of WLAN, AMPS, GSM, TDMA, or CDMA, and notify a user of a preferred available system or network.

FIG. 2 is an exemplary representation of some of the information included in a PRL 200. The PRL includes system identifier information 202 such as System Identification ("SID") and Network Identification ("NID") for cellular telephone networks, and Service Set Identifier ("SSID") for Wireless Local Area Network ("WLAN") systems. An enhanced roaming indicator ("ERI") 204 is assigned to each of the system identification information. Referring back to FIG. 1, the following information is assumed for the purpose of this illustration: the first network 106 has a NID of 1 and an ERI of 2, the second network 110 has a NID of 2 and an ERI of 3, and the third network 114 has a SSID of 3 and an ERI of 1, where a lower ERI represents a more preferred network. Carrier identity column 206, which may not be a part of the PRL, has been added for clarification for this example. If the multi-mode wireless communication device 102 were at a location where all three networks were available, then the third network 114 would be the most preferred network because the third network 114 has the lowest roaming indicator corresponding to the highest preference status among the available networks. The ERI further provides pointers to entries in a functionality extension table 300 as shown in FIG. 3. Each of the ERI 302 in the functionality extension table 300 is associated with an action entry 304, which directs the multi-mode communication device 102 to perform according to the 304 for a given ERI.

Figure 4:
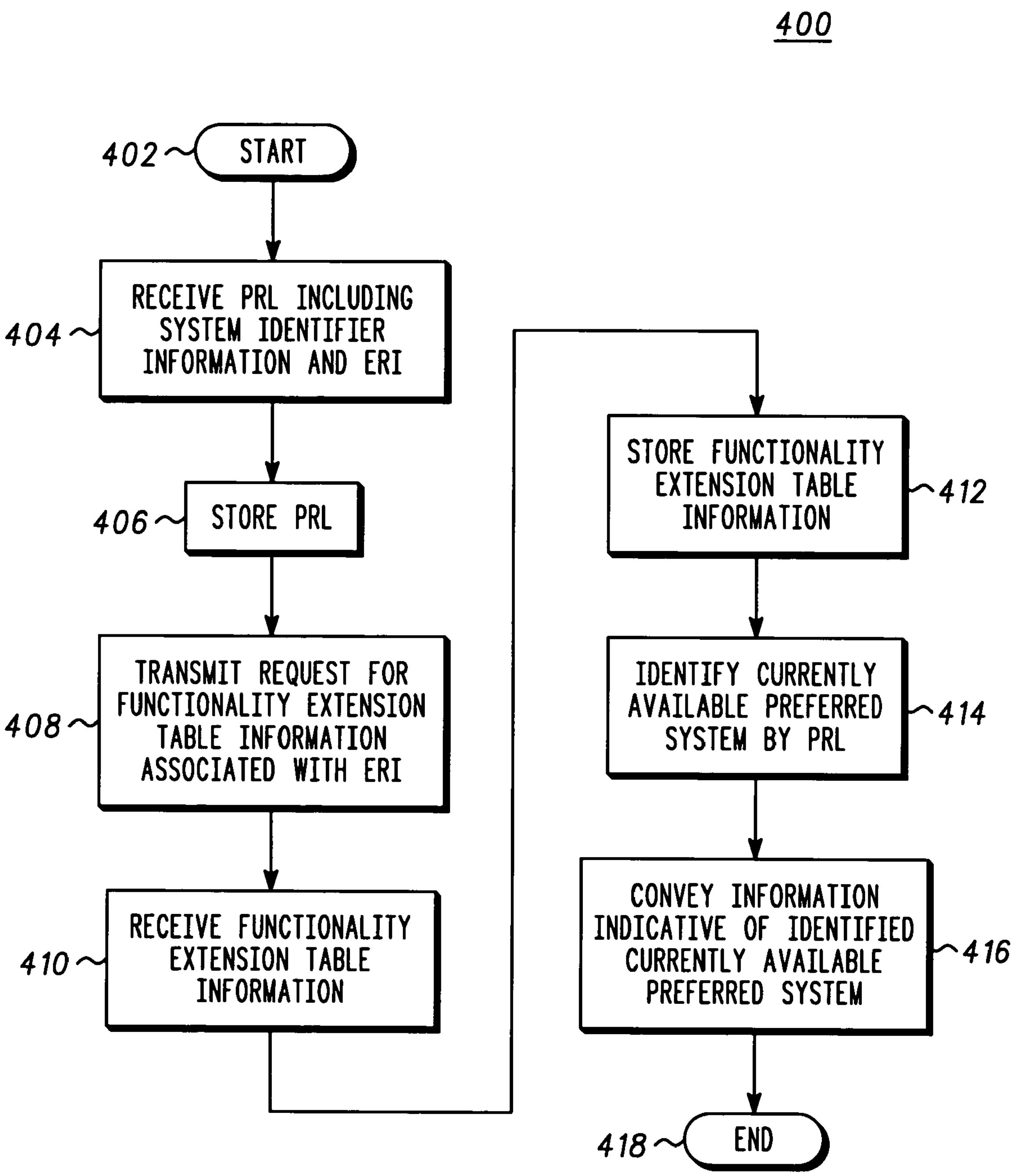
FIG. 4 is an exemplary flow chart describing a method for identifying a preferred system in accordance with the present invention.

FIG. 4 is an exemplary flow chart 400 describing a method in the multi-mode wireless communication device 102 for identifying a preferred system in accordance with the present invention. The process begins in block 402. In block 404, the multi-mode wireless communication device 102 receives preferred roaming list information, such as but not limited to, a preferred roaming list ("PRL") including system identifier information, such as SID, NID, and SSID, and ERI. The ERI is also effective in informing the multi-mode wireless communication device 102 that the entries, or the functionality extension table information, are available. In block 406, the received PRL is stored into the multi-mode wireless communication device 102, and then the multi-mode wireless communication device 102 transmits a request for functionality extension table information, which includes entries to the functionality extension table, associated with the ERI in block 408. The multi-mode wireless communication device 102 receives the functionality extension table information in block 410 in response to the transmitted request, and stores the received functionality extension table information in block 412. Based upon the system identifier information, such as SID, NID, and SSID, contained in the PRL, the multi-mode wireless communication device 102 identifies a currently available preferred system in block 414. The multi-mode wireless communication device 102 then conveys information indicative of the identified currently available preferred system based upon the functionality extension table information in block 416.

As previously described, the ERI provides pointers to entries in a functionality extension table. Using the SID, for example, of the identified currently available system, the multi-mode wireless communication device 102 performs according to the entry in the functionality extension table referenced by the functionality extension table reference information associated with the identified currently available system. The conveyance of the information may be accomplished by displaying a text message, displaying a particular icon, flashing an indicator light, or by any other relevant method appropriate for the multi-mode wireless communication device 102. The process then terminates in block 418.

The multi-mode wireless communication device 102 may receive the PRL in various ways. For example, the PRL may be loaded into the multi-mode wireless communication device 102 in a factory where the multi-mode wireless communication device 102 is built, at a retail store where the multi-mode wireless communication device 102 is sold, or by an over-the-air ("OTA") programming while the multi-mode wireless communication device 102 is in operation.

When a new PRL is received after the initial PRL and the functionality extension table information are received and stored, the multi-mode wireless communication device 102 determines whether the functionality extension table information is still synchronized with the new preferred roaming list information. If the functionality extension table information is no longer synchronized, then the multi-mode wireless communication device 102 may update the functionality extension table information.

Figure 5:
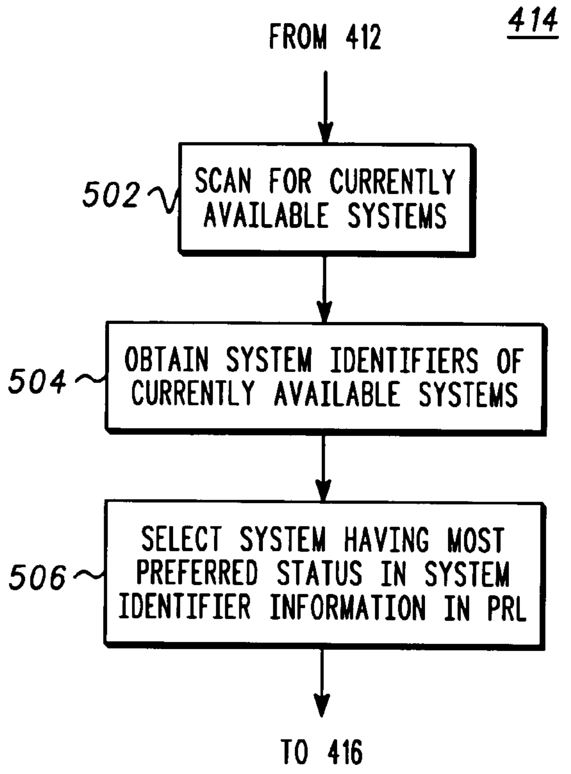
FIG. 5 is a first exemplary flow chart further describing a step in FIG. 3 of identifying a currently available preferred system.

FIG. 5 is a first exemplary flow chart further describing block 414 in FIG. 4 of identifying a currently available preferred system. In block 502, the multi-mode wireless communication device 102 scans for currently available systems, and obtains system identifiers of the currently available systems in block 504. From the currently available systems, the multi-mode wireless communication device 102 selects a system whose system identifier has the most preferred status found in the system identifier information of the PRL in block 506. Once the most preferred system is identified, a user of the multi-mode wireless communication device 102 may be given an option of whether to select the most preferred system for registering the multi-mode wireless communication device 102. Alternatively, the multi-mode wireless communication device 102 may automatically transmit a registration request to the most preferred system.

Figure 6:
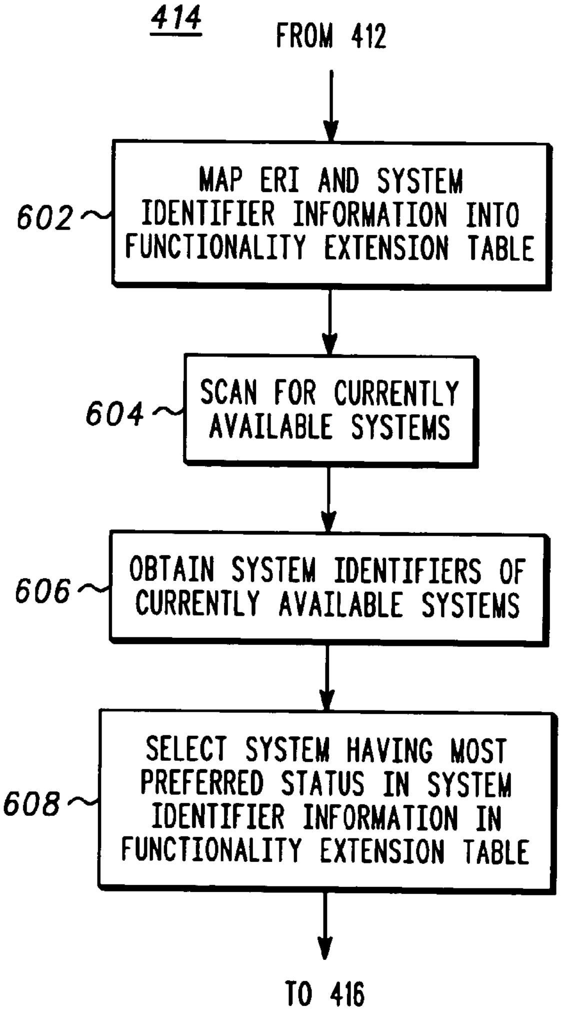
FIG. 6 is a second exemplary flow chart further describing a step in FIG. 3 of identifying a currently available preferred system.

FIG. 6 is a second exemplary flow chart further describing block 414 in FIG. 4 of identifying a currently available preferred system. In block 602, the multi-mode wireless communication device 102 maps the functionality extension table information and system identifier information into a functionality extension table, thereby combining two sets of information previously stored separately into one table. In block 604, the multi-mode wireless communication device 102 scans for currently available systems, and obtains system identifiers of the currently available systems in block 606. From the currently available systems, the multi-mode wireless communication device 102 selects a system whose system identifier has the most preferred status found in the system identifier information in the functionality extension table in block 608.

Figure 7:
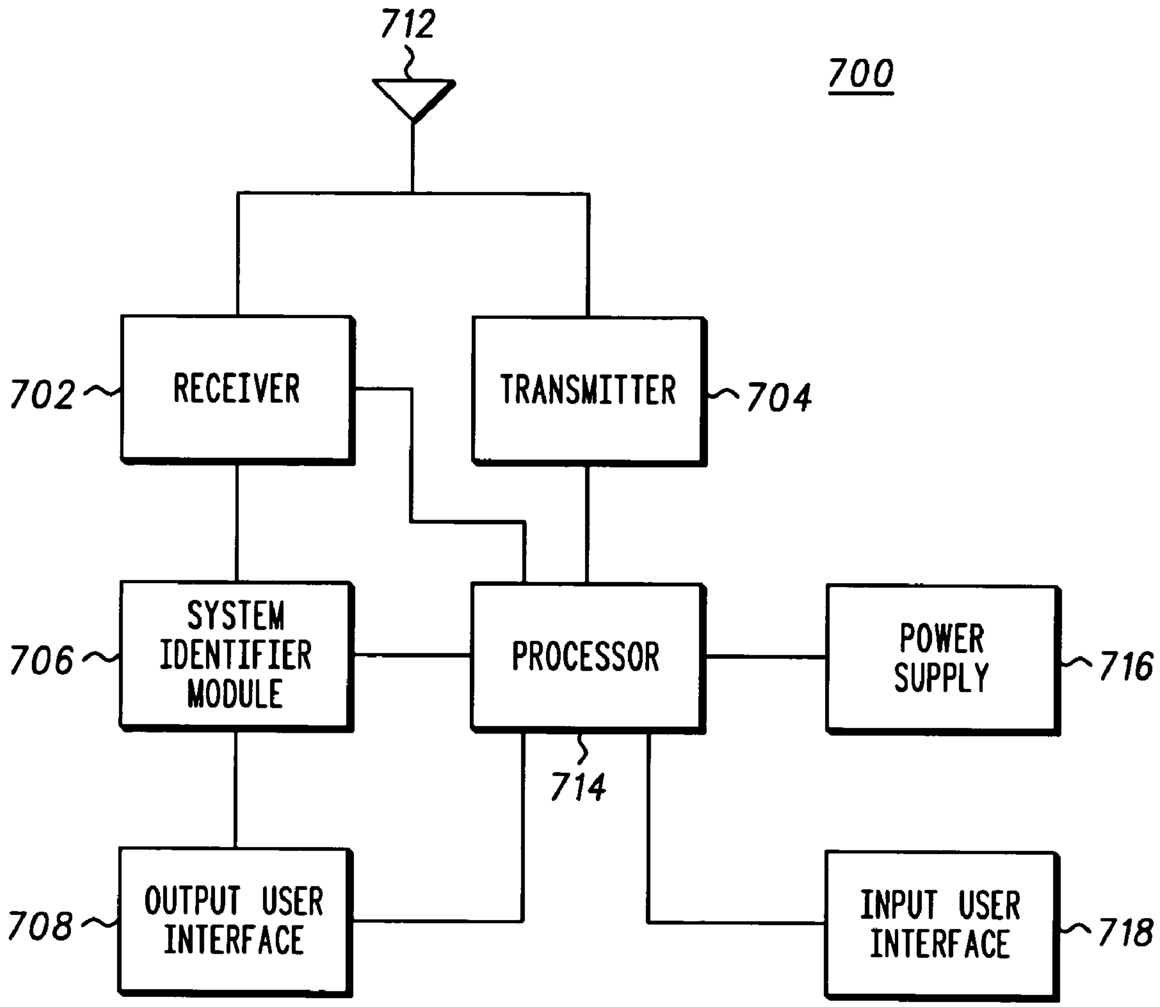
FIG. 7 is an exemplary block diagram of a multi-mode wireless communication device in accordance with the present invention.

FIG. 7 is an exemplary block diagram of a multi-mode wireless communication device 700 in accordance with the present invention. The multi-mode wireless communication device 700 is configured to identify a preferred system, and comprises a receiver 702, which is configured to receive preferred roaming list information, such as a preferred roaming list ("PRL") which includes system identifier information such as Network Identification ("NID") for cellular telephone networks, and Service Set Identifier ("SSID") for Wireless Local Area Network ("WLAN") systems. An enhanced roaming indicator ("ERI") is assigned to each of the system identification information. The ERI associated with the system identifier information provides pointers to entries in a functionality extension table, and further informs the multi-mode wireless communication device 700 that the entries, or the functionality extension table information, are available.

A transmitter 704 is coupled to the receiver 702, and is configured to transmit a request for the functionality extension table information in response to the reception of the preferred roaming list information. The receiver 702 is further configured to receive the functionality extension table information in response to the transmitted request. A system identifier module 706 is also coupled to the receiver 702, and is configured to identify a currently available preferred system based upon the system identifier information, such as SID, NID and SSID found in the PRL. An output user interface 708 is coupled to the system identifier module 706, and is configured to convey information indicative of the currently available preferred system based upon the functionality extension table information. The output user interface 708 may be a display, a light, a sound generator, or any device capable of conveying a relevant message indicative of the currently available preferred system. To determine a currently available preferred system, the receiver 702 is further configured to search for the currently available systems, and the system identifier module 706 is further configured to obtained system identifiers of the currently available systems and to correlate the system identifiers of the currently available systems with the system identifier information.

A functionality extension table generator 710 is coupled to the receiver 702 and to the system identifier module 706, and is configured to map the functionality extension table information received in response to the request transmission and the system identifier information included in the PRL into a functionality extension table. By mapping the functionality extension table information received and the system identifier information into the functionality extension table, the multi-mode wireless communication device 700 is enabled to convey information according to the functionality extension table information without first referring to the PRL.

The multi-mode wireless communication device 700 further includes functional blocks normally associated with a wireless communication device such as an antenna 712 coupled to the receiver 702 and to the transmitter 704; a processor 714 coupled to the receiver 702, the transmitter 704, the system identifier module 706, the output user interface 708, and the functionality extension table generator 710, and configured to instruct the coupled blocks and to perform associated functions; a power supply 716 coupled to the processor 714, and configure to supply power to any blocks requiring power; and an input user interface 718 such as a keypad and a microphone coupled to the processor 714, and configured to accept inputs from a user. The input user interface 718 may be further configured to accept a user input indicative of a user selection of the currently available preferred system, to which a registration request is transmitted. Alternatively, the transmitter 704 may be further configured to automatically transmit a registration request to the identified currently available preferred system.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a multi-mode wireless communication device for identifying a preferred system, the method comprising:

receiving preferred roaming list information including system identifier information and enhanced roaming indicators associated with the system identifier information;

storing the preferred roaming list information;

transmitting a request for functionality extension table information associated with the enhanced roaming indicators;

receiving the functionality extension table information in response to the transmitted request;

storing the functionality extension table information;

identifying a currently available preferred system based upon the system identifier information; and conveying information indicative of the identified currently available preferred system based upon the functionality extension table information.

2. The method of claim 1, further comprising:

accepting a user input indicative of a user selection of the currently available preferred system; and transmitting a registration request to the user selected currently available preferred system.

3. The method of claim 1, wherein the preferred roaming list information further includes preference status associated with the system identifier information.

4. The method of claim 3, wherein identifying the currently available preferred system by:

searching for currently available systems;

obtaining system identifiers of the currently available systems; and selecting from the currently available systems a system having a system identifier found in the system identifier information in the preferred roaming list information, the system identifier having the most preferred status.

5. The method of claim 4, further comprising:

transmitting a registration request to the selected currently available systems a system.

6. The method of claim 3, wherein identifying the currently available preferred system by:

mapping the functionality extension table information and the system identifier information into a functionality extension table;

searching for currently available systems;

obtaining system identifiers of the currently available systems; and selecting from the currently available systems a system having a system identifier found in the functionality extension table, the system identifier having the most preferred status.

7. The method of claim 1, wherein the functionality extension table information is synchronized with the preferred roaming list information.

8. The method of claim 7, further comprising:

updating previously stored functionality extension table information with the functionality extension table information received in response to the request.

9. The method of claim 1, wherein the system identifier information includes at least one of:

wireless local area networks information;

Advanced Mobile Phone System network information;

Global System for Mobile network information;

Time Division Multiple Access network information; and

Code Division Multiple Access network information.

10. A method in a multi-mode wireless communication device for identifying a preferred system, the method comprising:

receiving preferred roaming list information including system identifier information, enhanced roaming indicators associated with the system identifier information, and preference status associated with the system identifier information;

requesting functionality extension table information associated with the enhanced roaming indicators;

receiving the functionality extension table information;

mapping the functionality extension table information and the system identifier information into a functionality extension table;

identifying a currently available preferred system based upon the functionality extension table; and conveying information indicative of the identified currently available preferred system based upon the functionality extension table.

11. The method of claim 10, wherein the preferred roaming list information further includes preference status associated with the system identifier information, and wherein identifying the currently available preferred system further comprises:

searching for currently available systems;

obtaining system identifiers of the currently available systems; and selecting from the currently available systems a system having a system identifier found in the functionality extension table, the system having a most preferred status.

12. The method of claim 10, further comprising:

updating the functionality extension table with the functionality extension table information received in response to the request.

13. A multi-mode wireless communication device configured to identify a preferred system, the multi-mode wireless communication device comprising:

a receiver configured to receive preferred roaming list information including system identifier information and enhanced roaming indicators associated with the system identifier information, the receiver further configured to receive functionality extension table information associated with the enhanced roaming indicators;

a transmitter coupled to the receiver, the transmitter configured to transmit a request for the functionality extension table information in response to the reception of the preferred roaming list information;

a system identifier module coupled to the receiver, the system identifier module configured to identify a currently available preferred system based upon the system identifier information; and a user interface coupled to the system identifier module, the user interface configured to convey information indicative of the currently available preferred system based upon the functionality extension table information.

14. The multi-mode wireless communication device of claim 13, wherein the user interface is further configured to accept a user input indicative of a user selection of the currently available preferred system.

15. The multi-mode wireless communication device of claim 14, wherein the transmitter is further configured to transmit a registration request to the user selected currently available preferred system.

16. The multi-mode wireless communication device of claim 13, wherein:

the receiver is further configured to search for currently available systems, and the system identifier module is further configured to obtain system identifiers of the currently available systems and to correlate the system identifiers of the currently available systems with the system identifier information.

17. The multi-mode wireless communication device of claim 13, further comprising a functionality extension table generator coupled to the receiver and to the system identifier module, the functionality extension table generator configured to map the functionality extension table information and associated system identifier information into a functionality extension table, wherein:

the receiver is further configured to search for currently available systems, and the system identifier module is further configured to obtain system identifiers of the currently available systems and to correlate the system identifiers of the currently available systems with the mapped system identifier information in the functionality extension table.

18. The multi-mode wireless communication device of claim 13, wherein the system identifier information includes at least one of:

wireless local area networks information;

Advanced Mobile Phone System network information;

Global System for Mobile network information;

Time Division Multiple Access network information; and

Code Division Multiple Access network information.

* * * * *